Sept. 22, 1931.   J. H. MILLER   1,824,561
BALANCED MECHANISM FOR INSTRUMENTS
Filed May 8, 1930
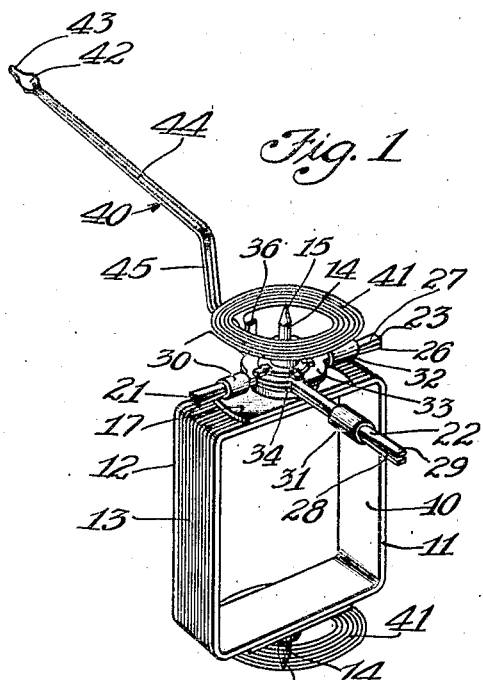
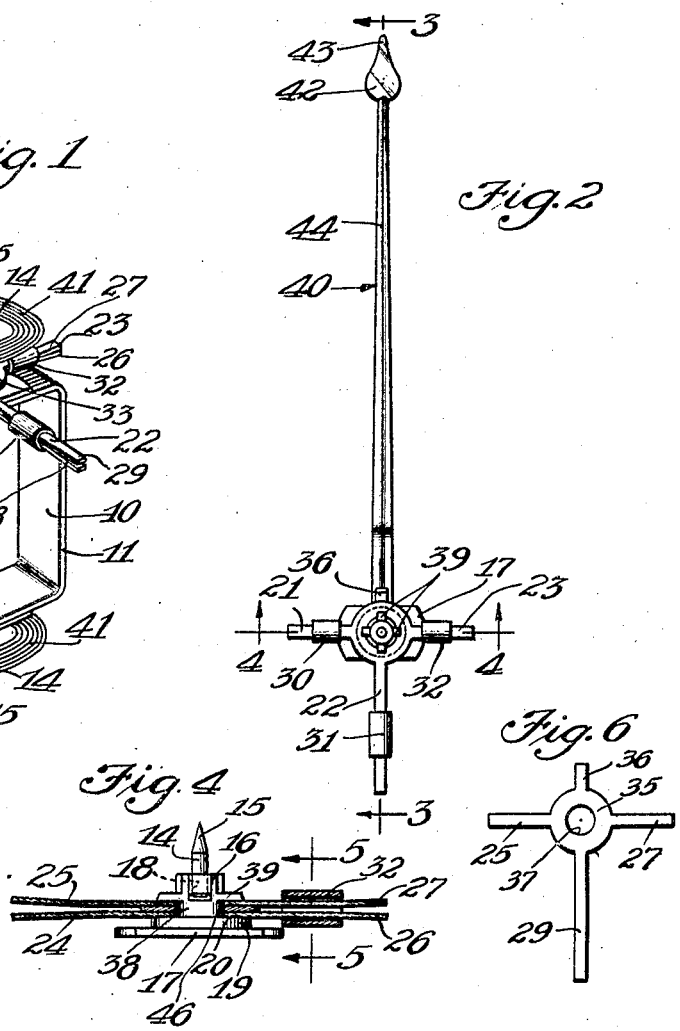
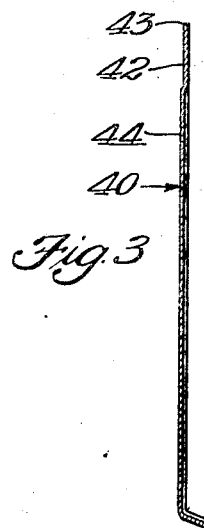
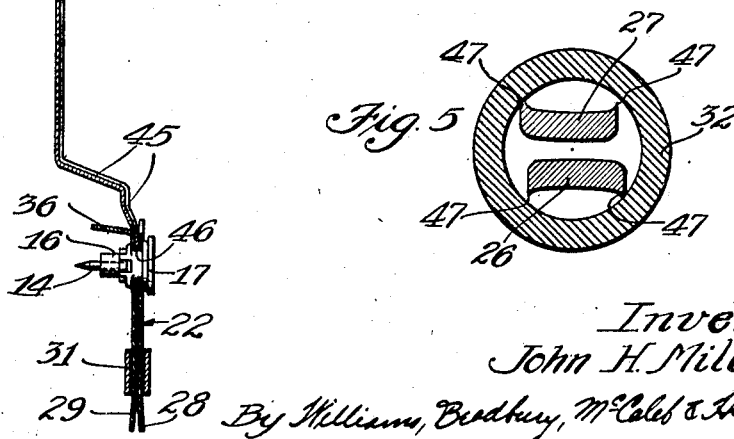
Inventor:
John H. Miller
By Williams, Bradbury, McCaleb & Hinkle
Attys.

Patented Sept. 22, 1931

1,824,561

UNITED STATES PATENT OFFICE

JOHN H. MILLER, OF OAK PARK, ILLINOIS, ASSIGNOR TO JEWELL ELECTRICAL INSTRUMENT CO., OF CHICAGO, ILLINOIS, A CORPORATION OF ILLINOIS

BALANCE MECHANISM FOR INSTRUMENTS

Application filed May 8, 1930. Serial No. 450,863.

The present invention relates to an improved balance mechanism for instruments, and is particularly concerned with the static balancing of electrical measuring instruments. While the mechanism is peculiarly adapted to be utilized for the static balancing of a pointer, it may also be employed upon any other moving parts of instruments or devices in which a static balance may be desirable.

In order to attain a static balance of the moving element of the electrical instruments of the prior art, it has heretofore been necessary to perform accurate machine work on very minute parts, such as cutting an accurate and fine thread in a minute nut and on a correspondingly small stud. Other forms of balancing weights have been screwed into frictional engagement with studs on the moving part, but the amount of frictional engagement which is present in such devices to assure maintenance of the adjustment under vibration, shock or use, renders the adjustment so hard that when an adjustment is made, it is very liable to injure the pivots or other parts of the delicate mechanism.

One of the objects of the present invention is the provision of an improved balance mechanism, by means of which the balance weights are held with sufficient firmness to assure maintenance of proper adjustment, but which is also adapted to permit release of the weights for ready adjustment without the application of any but the lightest force, thereby avoiding any possibility of injuring the pivots or other delicate parts.

Another object is the provision of an improved balance mechanism for instruments, which does not require the delicate machine work necessitated by the devices of the prior art, but which lends itself readily to manufacture by stamping operations, thereby reducing the cost of labor and machinery required.

Another object is the provision of an improved balance mechanism, including releasable balance members which are capable of being secured in any of a multiplicity of positions on the balancing arms of the movement, but which do not require the use of excessive force nor special tools for their adjustment.

Another object is the provision of an improved resilient securing device for simple balance weights on the movement of an instrument, which securing device is peculiarly adapted to have its tension readily adjusted to the point at which the maintenance of the adjustment is assured, but the force required for making an adjustment is not sufficient to damage the pivots or other parts, and by means of which the weight may be readily released for relatively free movement if the balance weight does not lend itself to ready adjustment by application of a light force.

Other objects and advantages of the invention will be apparent from the following description and from the accompanying drawings, in which similar characters of reference indicate similar parts throughout the several views.

Referring to the single sheet of drawings Fig. 1 is an enlarged view in perspective, of the moving element of an electrical instrument of the moving coil type, equipped with a balance mechanism constructed according to the present invention;

Fig. 2 is an enlarged plan view of the pointer and balance mechanism, with the torsion springs and coils removed;

Fig. 3 is an enlarged sectional view through one of the arms of the balance mechanism, taken on the plane of the line 3—3 of Fig. 2;

Fig. 4 is an enlarged sectional view taken on the plane of the line 4—4 of Fig. 2;

Fig. 5 is a detail, sectional view greatly enlarged, taken on the plane of the line 5—5 of Fig. 4; and Fig. 6 is a plan view of one of the supporting elements or plates for the balance weights.

The present balance mechanism may be used upon any type of moving element, but the type selected for illustration is the moving coil element of an electrical instrument, such as an ammeter. The moving coil element comprises a supporting frame 10, which may consist of a relatively short length of light and thin aluminum tube, preferably rectangular in cross section, having outwardly extending flanges 11, 12 at each side, forming a spool for supporting the coils of fine insulated wire 13, such as enameled wire.

Each end of the spool is provided with a hardened steel pivot 14 formed with a point 15 of substantially conical formation, and fixedly supported in a hub 16 of aluminum or other light, easily worked metal. The hub 16 is preferably supported upon a securing plate 17 which may be cemented or otherwise permanently secured to the ends of the spool 10 outside the coils 13, so as to secure the pivots 14 axially upon the moving element.

The hub 16 is provided with an axial bore 18 and the pivot pin 14 may be secured by a close frictional fit in the bore 18 or by pressing the metal of the hub 16 about the pivot pin 14, as described hereinafter. The hub 16 is also preferably formed with an enlarged portion 19 adjacent the securing plate 17, forming an annular shoulder 20 for securing the pointer and arms of a balance mechanism to the hub 16 by means of a riveting operation, as described hereinafter.

The balance mechanism for the moving element 10 preferably includes a plurality of symmetrically located balance arms 21, 22, 23, which preferably extend substantially radially with respect to the axis of rotation of the moving element 10 and the present balance arms preferably each include at least two resilient members 24, 25, 26, 27, 28, 29 for slidably and releasably securing the balance weights 30, 31, 32.

The balance mechanism is preferably constructed by providing two or more plates 33, 34 of relatively thin and light, yet resilient and hard material, such as spring brass or bronze, each of the plates having a centrally located body 35 which is preferably round to improve the balance of this element and which is provided with radially extending arms, such as the arms 25, 27, 29 and 36 in Fig. 6.

The body 35 is provided with a centrally located aperture 37 of sufficient size to receive the reduced cylindrical portion 38 of hub 16, and the complete assembly of balance mechanism and pointer may be secured upon hub 16 by rivet formations 39 which press the plates 33—34 against the shoulder 20 of hub 16. The riveting operation as illustrated, comprises the formation of a plurality of radially extending lugs 39 on hub 16 above the plates 33, 34, the lugs 39 being pressed out of parts of the hub 16, and this operation also serving to improve the securement of the pivot pin 14 in the hub 16, but any convenient form of riveting may be employed.

Although the present embodiment shows three radially extending arms 21, 22, 23 symmetrically located with respect to the pointer 40, it should be understood that in some embodiments of the invention, only a single balancing arm might be utilized or a greater number of symmetrically located balancing arms might be employed if a more accurate balance were desired, but the present embodiment accomplishes the degree or amount of balance usually desirable.

The balance plates 33, 34 may be provided with auxiliary arms such as the arm 36 which is bent upward in Fig. 1 to provide a support for securing one end of the spiral spring 41, the other end of which is secured to some fixed part of the instrument (not shown).

While the present balance mechanism may be utilized for balancing moving elements which do not have pointers, but which are provided with other unbalanced parts, the present invention finds its widest field of application to instruments having pointers, such as the pointer 40, which preferably consists of an elongated metal member constructed of relatively light metal, such as aluminum and formed with a head 42 having a point 43 located above the usual scale.

The pointer 40 is preferably formed with a longitudinally extending rib 44 for the purpose of increasing its rigidity and in order to bring the pointer up above a dial and to provide more room below the dial for other parts of the instrument, the pointer may be provided with one or more offsets 45. The end of the pointer opposite from point 43 is provided with an aperture 46 adapted to receive the reduced cylindrical part 38 of hub 16, and the pointer is preferably secured between the plates 33, 34, in order that this end of the pointer may perform the additional function of spacing the parts of the arms 21, 22, 23.

The plates 33, 34 of the balance mechanism are preferably formed by a stamping operation for the purpose of decreasing the cost of manufacture of these parts, and in order that the arms 24 to 29 may be provided with relatively sharp or cutting edges for better securing the balance weights 30 to 32 in adjusted position.

Referring to Fig. 5 showing a section of one of the balance weights and the parts of one balance arm, it will be observed that the resilient metal parts or arms 26, 27 are formed with relatively sharp burrs 47 at their outer edge, the burr being formed on the side toward which the cutting die is moving, and the plates 33, 34 are preferably arranged so that the burrs 47 on each arm extend in a direction opposite to the burrs on an arm immediately adjacent thereto. Thus each of the arms 21 to 23 is formed by a pair of resilient spreading members having relatively sharp cutting edges 47 which tend to cut into the inner wall of the weights 30 to 32.

The weights 30—32 preferably consist of tubular metal members of relatively soft metal such as aluminum which is capable of being cut at least to some degree by the relatively hard resilient arms 24—29 of spring bronze or brass.

The amount of tension of the respective part of the arms 21—23 may be regulated by bending the arms apart so that the parts of each arm, as for instance, 26, 27, resiliently engage the inside of the corresponding tube 32 to hold the tubular weight in any adjusted position. The regulation of the tension may be improved, however, by skewing the respective parts of each arm, that is, bending the arm 27 laterally with respect to the arm 26, thereby increasing the tension of the arms since the arms are more rigid in the plane of their widest dimension as shown in Fig. 5, and it will be evident that the amount of tension of the balance arms may be regulated as desired to secure the weights in any adjusted position without danger of change of the static balance by vibration, shocks or abuse of the instrument.

The tension may be so regulated that the weights will move sufficiently easily to allow for adjustment without damaging the pivots or the moving element, but the force required is such that the weight will not move of its own accord under any condition of service. Furthermore, if necessary, the weights may be released by simply pressing the resilient parts of each arm together, after which free movement of the weight is assured, and the adjustment of the weights to secure a static balance may be accomplished without the use of any special tools and without danger of damaging the delicate parts of the instrument.

It will thus be observed that I have invented an improved balance mechanism including resilient balance arms for slidably or releasably securing balance weights in such manner that an adjustment may be readily effected without possibility of injury to the instrument, and all of the parts of the balance mechanism lend themselves readily to manufacture by ordinary stamping operations or cutting from stock materials, so that the present device is peculiarly adapted to be made at a low cost. The vibration tests and life tests of the present balance mechanism show that there is no difficulty experienced due to the weight moving after originally adjusted, but if any weight should tend to stick during an adjusting operation, it may be readily released by a slight pressure on the resilient parts of the balance arm.

The present construction greatly reduces the cost of this part of the instrument over the old methods of construction which involve the cutting of fine threads on a balance arm and in a nut, and the possibility of the balance weight binding upon a balance arm so as to require the use of excessive force in effecting an adjustment is also eliminated.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a measuring instrument, the combination of a support with a rotating movement, a balance mechanism comprising an outwardly projecting arm including a plurality of resilient members, and a balance weight carried by said resilient members and frictionally engaged thereby.

2. A balance mechanism comprising a pointer, a pair of resilient sheet metal arms spaced from each other by said pointer, and a metal member slidably and releasably engaged by said resilient metal arms for improving the balance of said pointer, said arms extending at a slight angle with respect to each other to increase the tension of said arms.

3. A balance mechanism for instruments, comprising a moving element, a hub carried thereby and having a shoulder for engaging a pointer assembly, a pointer, and a pair of resilient metal arms mounted on said hub and confined against said shoulder by rivet formations on said hub, and a metal balance member slidably mounted on said metal arms, said arms having outwardly turned burred corners and said metal member comprising a tubular member of softer metal than said arms.

4. A balance mechanism for instruments, comprising a moving element, a hub carried thereby and having a shoulder for engaging a pointer assembly, a pointer, a pair of resilient sheet metal members, each having a plurality of symmetrically arranged arms, arranged on said hub on opposite sides of said pointer and spaced from each other by said pointer, and tubular soft metal members slidably mounted on said arms and resiliently engaged thereby, the arms of each member extending at a slight angle with respect to the adjacent arm to increase the tension of said arms, said arms having burred edges turned outward to engage said tubular members.

5. A balanced mechanism comprising a pointer, a pair of resilient sheet metal arms spaced for each other by said pointer and fixedly secured to said pointer, said metal arms projecting in an opposite direction from said pointer and being adapted to spring apart, and a metal member slidably and releasably engaged by said resilient metal arms for improving the balance of said pointer.

6. A balanced mechanism comprising a metal plate formed with an annular shoulder and a hub, a pointer carried by said hub, a pair of resilient metal members of cruciform shape located on said hub and spaced from each other by said pointer, and tubular metal members on each of the arms of said cruciform members, said tubular members comprising balance weights releasably and slidably engaged by the arms of said cruciform members when said cruciform members are sprung apart.

In witness whereof, I hereunto subscribe my name this 2nd day of May, 1930.

JOHN H. MILLER.